(12) United States Patent
Schustek et al.

(10) Patent No.: US 6,878,092 B1
(45) Date of Patent: Apr. 12, 2005

(54) DRIVE ARRANGEMENT FOR AT LEAST ONE SECONDARY AGGREGATE OF A MOTOR VEHICLE AND METHOD FOR OPERATING THE DRIVE ARRANGEMENT

(75) Inventors: Siegfried Schustek, Ditzingen (DE); Ullrich Hesse, Affalterbach (DE); Daniel Damson, Ditzingen (DE); Hans-Ruediger Weiss, Stuttgart (DE); Klaus-Peter Schnelle, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,513

(22) PCT Filed: Jan. 31, 2000

(86) PCT No.: PCT/DE00/00243
§371 (c)(1),
(2), (4) Date: Nov. 13, 2000

(87) PCT Pub. No.: WO00/46059
PCT Pub. Date: Aug. 10, 2000

(30) Foreign Application Priority Data

| Feb. 1, 1999 | (DE) | ................................ 199 03 864 |
| Oct. 28, 1999 | (DE) | ................................ 199 51 833 |
| Dec. 15, 1999 | (DE) | ................................ 199 60 681 |
| Jan. 15, 2000 | (DE) | ................................ 100 01 436 |

(51) Int. Cl.[7] ............................ B60K 41/02; F16H 3/72
(52) U.S. Cl. ............................................. 477/3; 475/5
(58) Field of Search .... 475/5, 6; 477/3; 180/65.2–65.4

(56) References Cited

U.S. PATENT DOCUMENTS

| 4,481,841 A | | 11/1984 | Abthoff |
| 4,991,400 A | * | 2/1991 | Wilkinson .................. 62/228.4 |
| 5,337,848 A | * | 8/1994 | Bader ......................... 477/5 X |
| 5,468,194 A | | 11/1995 | Hayashi |
| 5,669,842 A | * | 9/1997 | Schmidt ......................... 475/5 |
| 5,826,671 A | * | 10/1998 | Nakae et al. ............... 180/65.3 |
| 5,903,061 A | * | 5/1999 | Tsuzuki et al. ............. 477/3 X |
| 5,904,631 A | * | 5/1999 | Morisawa et al. ............. 475/5 |
| 5,991,683 A | * | 11/1999 | Takaoka et al. ............ 477/3 X |
| 6,048,288 A | * | 4/2000 | Tsujii et al. .................... 477/5 |
| 6,131,538 A | * | 10/2000 | Kanai .................... 180/65.2 X |
| 6,135,914 A | * | 10/2000 | Yamaguchi et al. ............ 477/3 |
| 6,258,006 B1 | * | 7/2001 | Hanyu et al. .................. 477/5 |
| 6,276,472 B1 | * | 8/2001 | Takashima et al. ......... 180/65.2 |
| 6,294,843 B1 | * | 9/2001 | Kato et al. ............. 180/65.2 X |
| 6,306,056 B1 | * | 10/2001 | Moore ........................... 475/5 |

FOREIGN PATENT DOCUMENTS

| EP | 0 645 271 A | | 3/1995 |
| JP | 411287141 | * | 10/1999 |

* cited by examiner

*Primary Examiner*—Roger Pang
(74) *Attorney, Agent, or Firm*—Michael J. Striker

(57) ABSTRACT

A drive arrangement for at least one auxiliary system of a motor vehicle, having an internal combustion engine, at least one supplementary motor, and a gear, is provided. The gear is a planetary gear which is operatively connected to the engine and the at least one supplementary motor each via a respective input shaft, and to the auxiliary system via an output shaft.

11 Claims, 4 Drawing Sheets

DRIVE ARRANGEMENT FOR AT LEAST ONE SECONDARY AGGREGATE OF A MOTOR VEHICLE AND METHOD FOR OPERATING THE DRIVE ARRANGEMENT

The invention relates to a drive arrangement for at least one auxiliary system of a motor vehicle, having the characteristics recited in the preamble to claim 1, and to a method for operating such a drive arrangement, having the characteristics recited in the preamble to claim 5.

PRIOR ART

Drive arrangements of this generic type are known and are used for instance in motor vehicles. An internal combustion engine is typically used as the drive arrangement for the motor vehicle. The engine can also be used to operate numerous auxiliary systems. Such auxiliary systems must often be operated in a certain rpm range, so that it is known to make a suitable gear ratio possible via an intervening gear. However, since a power requirement by the auxiliary systems is usually independent of the power requirement of the drive arrangement, it has proved to be advantageous for a supplementary motor for operating the auxiliary systems to be integrated into the motor vehicle. Thus the supplementary motor furnishes a torque, independently of a dynamic driving situation of the motor vehicle, that can be utilized to operate the auxiliary systems. The supplementary motor may be a second internal combustion engine or can also be designed as an electric machine.

It is also known to make a reinforcing torque available for operation of the auxiliary systems by the engine. However, in the known arrangements the engine is coupled directly with a starter generator; that is, a torque of the engine is first converted into an electrical output, and to operate nonelectrical auxiliary systems this must be converted in turn into a mechanical power. The resultant efficiency overall is accordingly highly unfavorable.

The disadvantages of known drive arrangements are especially apparent in the operation of climate control compressors. While it is known to operate such compressors directly via the engine, in that case the power design of the compressor must be made in accordance with an idling rpm of the engine. On the one hand this leads to oversized climate control compressors, and on the other it has proved unfavorable for auxiliary systems of this type to be associated directly with the engine. In an acceleration process, for instance, or an engine starting phase, torque requirements of the climate control compressor can impede the dynamic driving operation or starting. As a remedy, it is therefore know to integrate a second climate control compressor, which is electrically operated, into the motor vehicle. The electrical drive is typically done via the starter generator and via the on-board battery. Besides the increased expenditure of material, however, it is disadvantageous that the conversion efficiency of the starter generator and the efficiency of charging and discharging the on-board battery are not optimal from the energy standpoint and thus in the final analysis mean increased fuel consumption.

In addition, planetary gears are known in which at least one planet wheel orbits around a stationary sun wheel. A power takeoff in planetary gears can selectively be done via an output shaft that is connected operatively to the planet wheel and/or the sun wheel. Also engaging the planetary gear are two input shafts, which independently of one another transmit a torque from which the torque of the output shaft results. A speed increase of the input rpm of the input shafts relative to the output rpm of the output shafts can be selected by means of a suitable design of the planetary gear. A design of the power takeoff is highly variable and can be done for instance via a hollow wheel that is operatively connected to the planet wheel.

ADVANTAGES OF THE INVENTION

The drive arrangement of the invention has the advantage that operation of the auxiliary systems can be done both via the at least one supplementary motor and via the internal combustion engine. In certain driving situations, such as during starting or during passing, the torque for operating the auxiliary systems can be made available for the most part by the supplementary motor, while in normal driving operation, for instance beyond a certain rpm of the engine, the operation is done predominantly via the torque made available by the engine. Such an operation can be achieved by providing that the gear is a planetary gear, which is operatively connected to the engine and the at least one supplementary motor, each via a respective input shaft, and to the auxiliary system via an output shaft.

The supplementary motor can be a second internal combustion engine, which is put into operation only when the vehicle is at a stop. Not all the auxiliary systems, such as a generator, the climate control compressor, a servo pump or a water pump, necessarily have to be driven via an output shaft of the planetary gear. In driving operation, the drive can be done via the drive motor, which has advantages in terms of energy. This system has energy advantages, since the differential efficiency, as a ratio of the required drive power for the auxiliary systems to the additional fuel consumption, is higher overall. The supplementary motor can also be an electric machine, such as a starter generator of the internal combustion engine. Hence via the starter generator, it is possible in certain operating situations to operate the climate control compressor, for instance.

It is also advantageous that often, lower rpm levels then are specified by the engine are needed for optimally efficient operation of auxiliary systems. This can be achieved in a simple way by means of a gear ratio of the planetary gear. In particular, the planetary gear can be a component of a vehicle transmission. This is especially advantageous in the case of a transmission including a total of two electric machines and two planetary gears. Then the auxiliary system is driven by one of the available transmission shafts.

The drive of the drive arrangement can advantageously be done in that (a) the gear is a planetary gear with at least two input shafts and at least one output shaft, and a torque is transmitted from the engine and the at least one supplementary motor via a respective one of the input shafts, to the output shaft and subsequently to the auxiliary system; and (b) a control unit is assigned to the drive arrangement and detects an rpm of the output shaft and governs the supplementary motor as a function of the rpm.

If the at least one supplementary motor is an electric machine, then the moment can also become negative, because then the supplementary motor is functioning as a generator. The rpm of the output shaft of the drive arrangement can be detected by means of a sensor and evaluated in a suitable control unit. After that, the supplementary motor can then be controlled as a function of the detected rpm. By means of such an arrangement, the operation of the auxiliary system can be done within a predetermined, defined rpm range (set-point range), or at a predetermined rpm (set-point value).

In motor vehicles, the operation of such a drive arrangement can for instance be done such that as a function of a basic rpm or medium rpm of the engine, a force transmission of the supplementary motor is controlled. For instance, if the rpm of the output shaft of the drive arrangement is below a limit value, then an additional force transmission takes place via the input shaft of the supplementary motor. If the rpm is higher than the limit value, then a force input from the supplementary motor is reduced. In the latter case, if the supplementary motor is an electric machine, it can be operated with the aid of suitable control means as a generator or electric brake, including a reversal of its direction of rotation, so that any slip of the engine that occurs is converted into electrical energy.

The drive arrangement according to the invention has proved to be especially advantageous if the auxiliary system to be operated is a climate control compressor. On the one hand, by being decoupled from the idling rpm of the engine, the climate control compressor can be designed to be smaller. Losses of the kind that occur in modern regulated climate control compressors in the partial-load range can be averted. On the other, the reinforcement of the torque required by the climate control compressor that is offered by the supplementary motor provides still further advantages in the operation of the motor vehicle in certain driving situations. For instance, the climate control compressor can be operated continuously even if the engine is turned off for the sake of a fuel-saving start-stop mode. Furthermore, if the drive arrangement makes especially high power demands of the engine, the power of the supplementary motor can be increased accordingly, so that for a short time the full power of the engine can be utilized to drive the motor vehicle. In the case where the supplementary motor is an electric machine (and especially a starter generator), air conditioning while parked, or precooling of the motor vehicle, can be done.

Control of the supplementary motor can advantageously be done as a function of a driving situation (such as being stopped or moving) and an engine operating state (such as turned off, or running). For instance if the vehicle is stopped and the engine is turned off, then first, idling is selected via a transmission converter. The drive of the auxiliary system (such as the climate control compressor) then takes place via the electric machine (for instance, the starter generator). In climate control compressors, it has proved advantageous to limit a maximum rpm and/or rpm spread, for the sake of unimpeded operation. This can be achieved for instance with a spur gear stage and/or a reversible step-up gear that precedes the climate control compressor.

Further preferred features of the invention will become apparent from the other characteristics recited in the dependent claims.

DRAWINGS

The invention will be described below in terms of an exemplary embodiment in conjunction with the associated drawings.

DESCRIPTION OF THE EXEMPLARY EMBODIMENT

Figure 1:
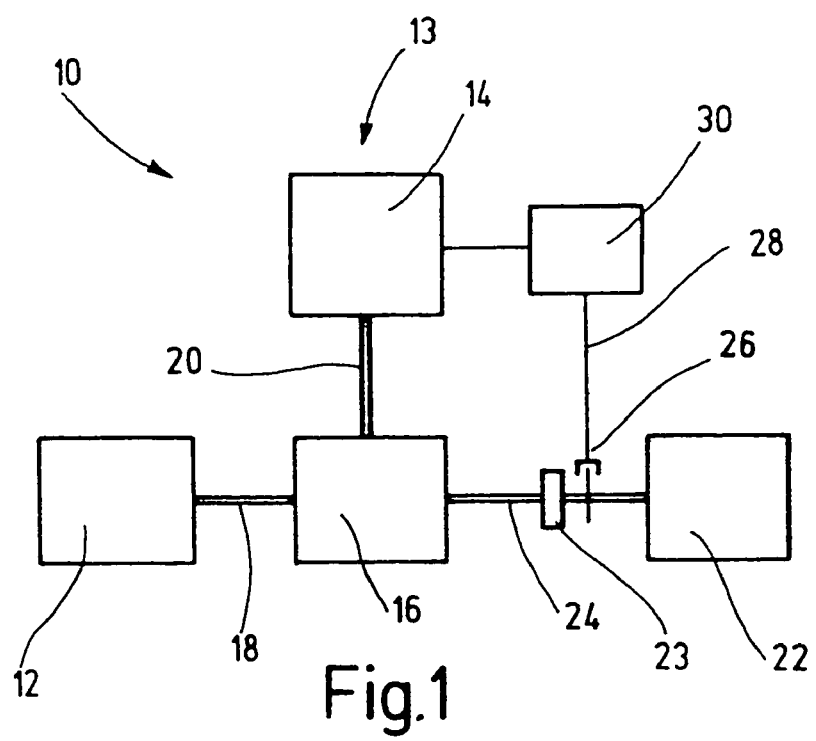
FIG. 1 is a schematic block circuit diagram of a first drive arrangement, with an electric machine as a substitute motor.

In FIG. 1, a schematic block circuit diagram of a drive arrangement 10 in a first exemplary embodiment is shown; the drive arrangement 10 comprises an internal combustion engine 12, an electric machine 14 as a supplementary motor 13, and a gear 16. The engine 12 is connected to the gear 16 via an input shaft 18, and the electric machine 14 is connected to the gear 16 via an input shaft 20. An auxiliary system 22 is also shown, which is operatively connected to the gear 16 via an output shaft 24 and a free-wheel coupling 23. By means of a sensor 26, a rotary speed or rpm of the output shaft 24 can be detected and transmitted over a data line 28 to a control unit 30, from which an operation of the electric machine 14 can be controlled.

As much as possible, the operation of the auxiliary system 22 should be done at a favorable rpm (set-point value) or in a favorable rpm range (set-point range) of the output shaft 24. By means of the drive arrangement 10, this rpm range can be achieved in a simple way and with overall favorable efficiency. The rpm range has an upper and a lower limit value.

First, a torque from the engine 12 is transmitted to the gear 16 via the input shaft 18 and then from the gear 16 to the output shaft 24. If the rpm of the output shaft 24 is less than the lower limit value, then in addition a torque is transmitted to the gear 16 by means of the electric machine 14 via the input shaft 20. If the rpm of the output shaft 24 exceeds the upper limit value, then first an excess power of the engine 12 is output as slip, and second an undesired force transmission by the electric machine 14 is prevented. In the latter case, however, the slip can also be utilized to generate electrical energy, by operating the electric machine 14 as a generator using suitable control means. The electric machine 14 can also be operated as an electric brake.

By means of the control unit 30, on the one hand the rpm of the output shaft 24 can be both detected and governed via the sensor 26. On the other, the control unit 30 serves to set an operating state of the electric machine 14. As already explained, the electric machine 14 is then selectively switched as a generator or as a drive means.

Figure 2:
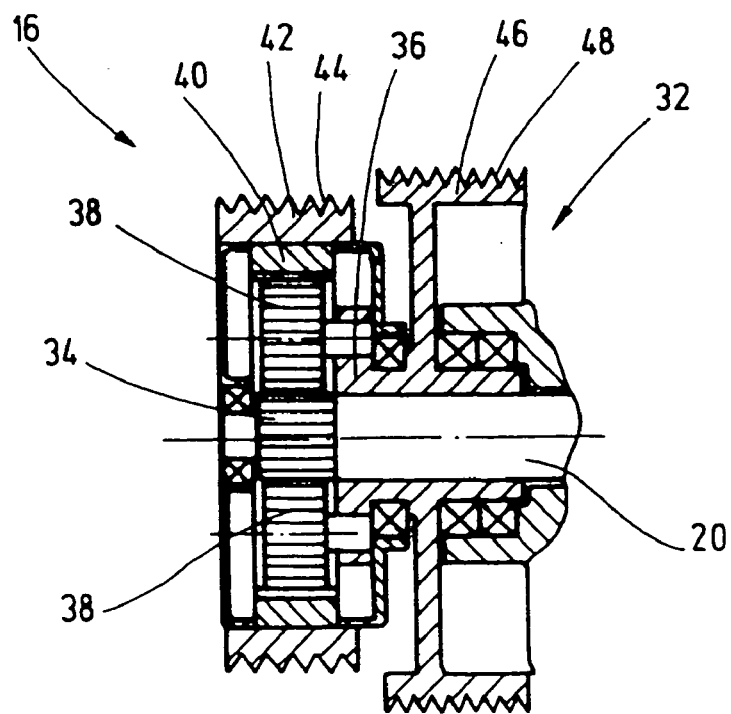
FIG. 2 is a schematic sectional view through a gear of a drive arrangement.

FIG. 2 shows a sectional view of the gear 16 of the drive arrangement 10. The gear 16 is a planetary gear 32, with a sun wheel 34 and the planet wheels 38. The sun wheel 34 is solidly connected to the input shaft 20 of the electric machine 14 and has a set of teeth which mesh with a complimentary set of teeth of the planet wheels 38. The planetary gear 32 also has a carrier 36, which is operatively connected on the one hand to the planet wheels 38 and on the other to a pulley 46, which has a set of teeth 48. By means of a tension means (belt), not shown here, the torque of the engine 12 is transmitted to the pulley 46 and subsequently to the planet wheels 38.

The planet wheels 38 are also assigned a hollow wheel 40 with suitable toothing, and this wheel is solidly connected to a further pulley 42 that has a set of teeth 44. Via a further tension means (belt) not shown here, which is seated on the pulley 42, a force transmission takes place to the input shaft 24, also not shown here, of the auxiliary system 22.

Instead of the pulleys 42, 46, suitable gear wheels can also be used for transmitting force between the planetary gear 32 and the engine 12, or the auxiliary system 22. The number of planet wheels 38 can also be varied, and by a suitable design of the planetary gear, a desired gear ratio can be realized.

Along with the power takeoff shown in FIG. 2, in which the sun wheel 34 transmits the torque of the input shaft 20 of the electric machine 14 only indirectly via the planet wheels 38, gears 16 are also conceivable in which a direct force transmission from the sun wheel 34 and an indirect force transmission from the planet wheels 38 via the sun wheel 34 are achieved. In that case, a gear wheel, not shown here, is operatively connected in a suitable way to the sun wheel 34 and the output shaft 24. Thus even a plurality of auxiliary systems 22 can be driven at least two gear ratios. If the power takeoff is effected via the planet wheels 38, then gear ratios in a range of about 1.25 to 1.67 are preferred, and if power takeoff is via the sun wheel 34, gear ratios of about 2.5 to 6 are preferred.

Figure 3:
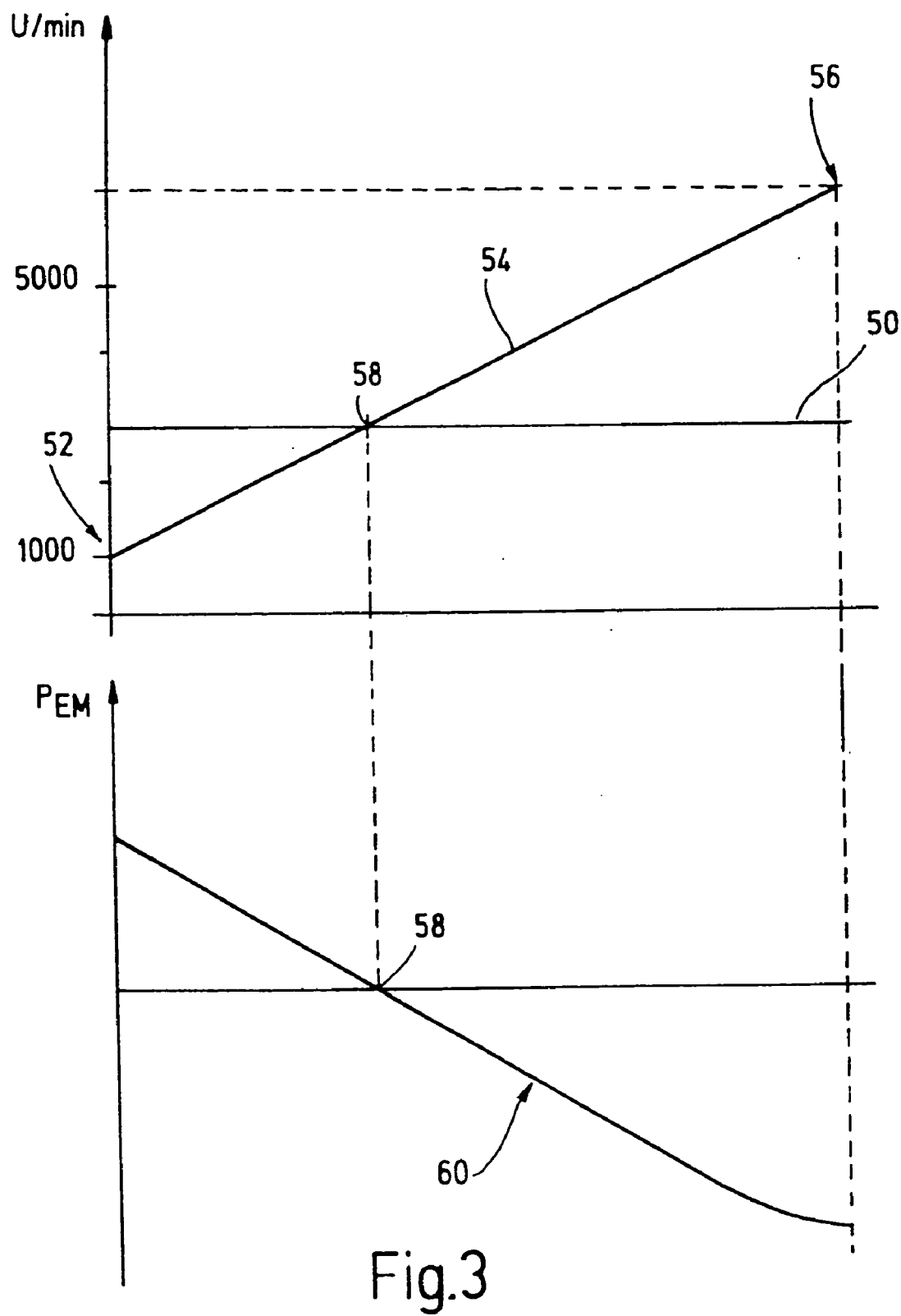
FIG. 3 is an rpm graph for a drive arrangement of the invention.

FIG. 3, in two examples of graphs, show how control and/or governing of the electric machine 14 can be done in the drive arrangement 10. An rpm 50 of the output shaft 24 of the drive arrangement 10 is plotted in the upper graph. It is understood that the value 50 of the rpm can be selected to meet the requirements of the auxiliary system 22 to be operated. Based on a basic rpm 52 of the engine 14, which here as an example is 1000 rpm, a straight line 54 extends up to a maximum rpm 56 of the engine 14. To keep the rpm 50 of the output shaft 24 constant, power must therefore either be supplied or taken away. In the latter case, the excess power can remain unused in the form of a slip, or it can be utilized to drive a generator. Since the supply of power below the rpm 50 is effected via the electric machine 14, it is especially advantageous to design the electric machine such that above the rpm 50, it can be operated as a generator.

The power of the electric machine 14 is shown as a function of the rpm of the engine 12 in the lower graph in FIG. 3. This clearly shows that up to a point 58, at which the rpm of the engine 12 is below the rpm 50, a suitable power is contributed by the electric machine 14. If the rpm of the engine 12 exceeds the rpm 50 of the output shaft 24 at the point 58, then the electric machine 14 is switched here in such a way that it can be operated as a generator. To prevent overheating in the generator mode, the transmitted power at high rpm levels of the engine 12 can be limited and remain unused as slip, so that a power curve 60 of the electric machine 14, at relatively high rpm levels of the engine 12, has a degressive course. Control of the electric machine 14 can —as already explained —be effected via the control unit 30.

Possible examples of auxiliary systems 22 of the motor vehicle to be operated are a generator, servo pump, water pump, oil pump, or in particular a climate control compressor. The latter can be made smaller in terms of its dimensions than in conventional drive arrangements, in which the climate control compressor is operated directly via the engine 12, because an rpm range of the climate control compressor does not have to be adapted to an idling rpm of the engine 12. To enable precooling of the motor vehicle or cooling while it is parked, the climate control compressor can be operated via the electric machine 14. The electrical power is then converted into a mechanical power via the gear 16. Thus if the engine 12 is turned off for the sake of a start-stop mode of the motor vehicle, the torque required by the climate control compressor can be furnished by the electric machine 14, thus assuring continuous cooling of the motor vehicle interior.

Figure 4:
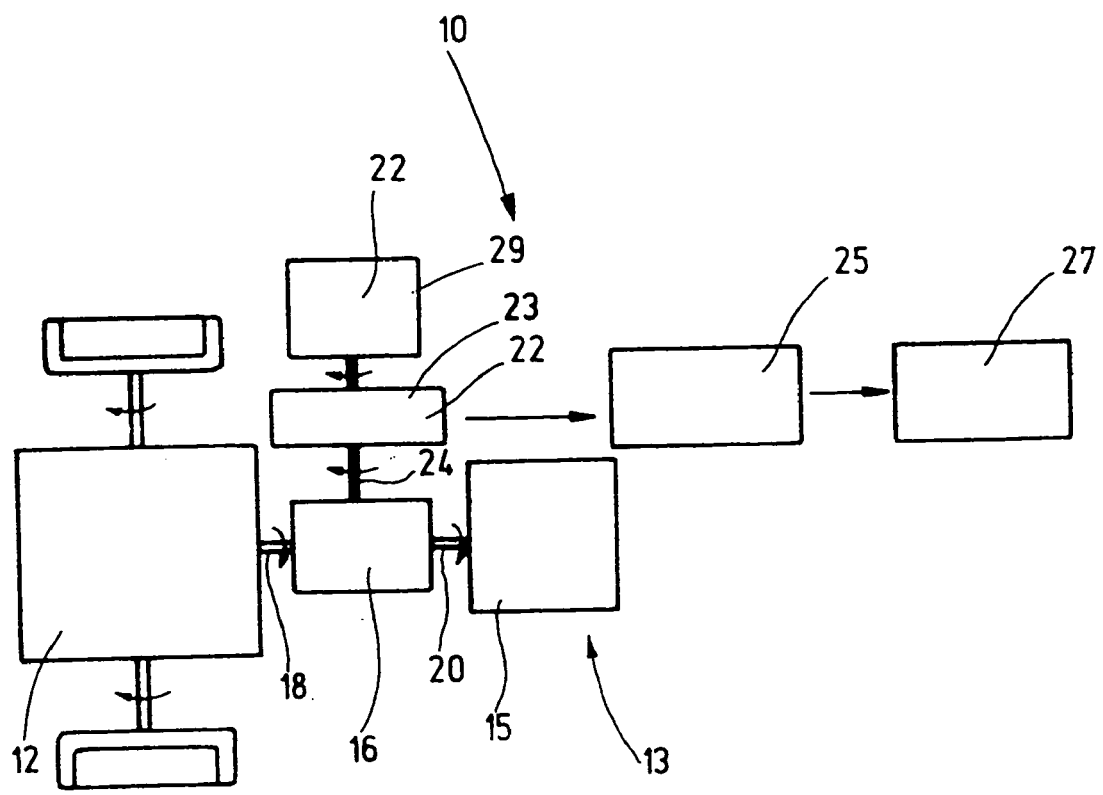
FIG. 4 is a schematic plan view on a second drive arrangement, with a second internal combustion engine as a supplementary motor.

FIG. 4 shows a schematic plan view on a further drive arrangement 10, in which the supplementary motor 13 is a second internal combustion engine 15. As already explained, the torques are transmitted to the gear 16 via the input shafts 18, 20, resulting in a torque for the output shaft 24 that is utilized for operating the auxiliary system 22.

In the exemplary embodiment, a total of two auxiliary systems 22 are coupled to the gear 16. For instance, on the one hand a generator 23 can furnish electrical energy, which is fed into an on-board electrical system 25. After that, the electrical energy can be used to operate electric auxiliary systems 27. On the other hand, the climate control compressor 29 is also supplied with the energy it requires for operation, via the gear 16. Control of the second engine 15 can be done in the same way as already explained in the exemplary embodiment above. For the sake of simplicity, the control unit 30 required for this purpose has therefore not been shown.

Figure 5:
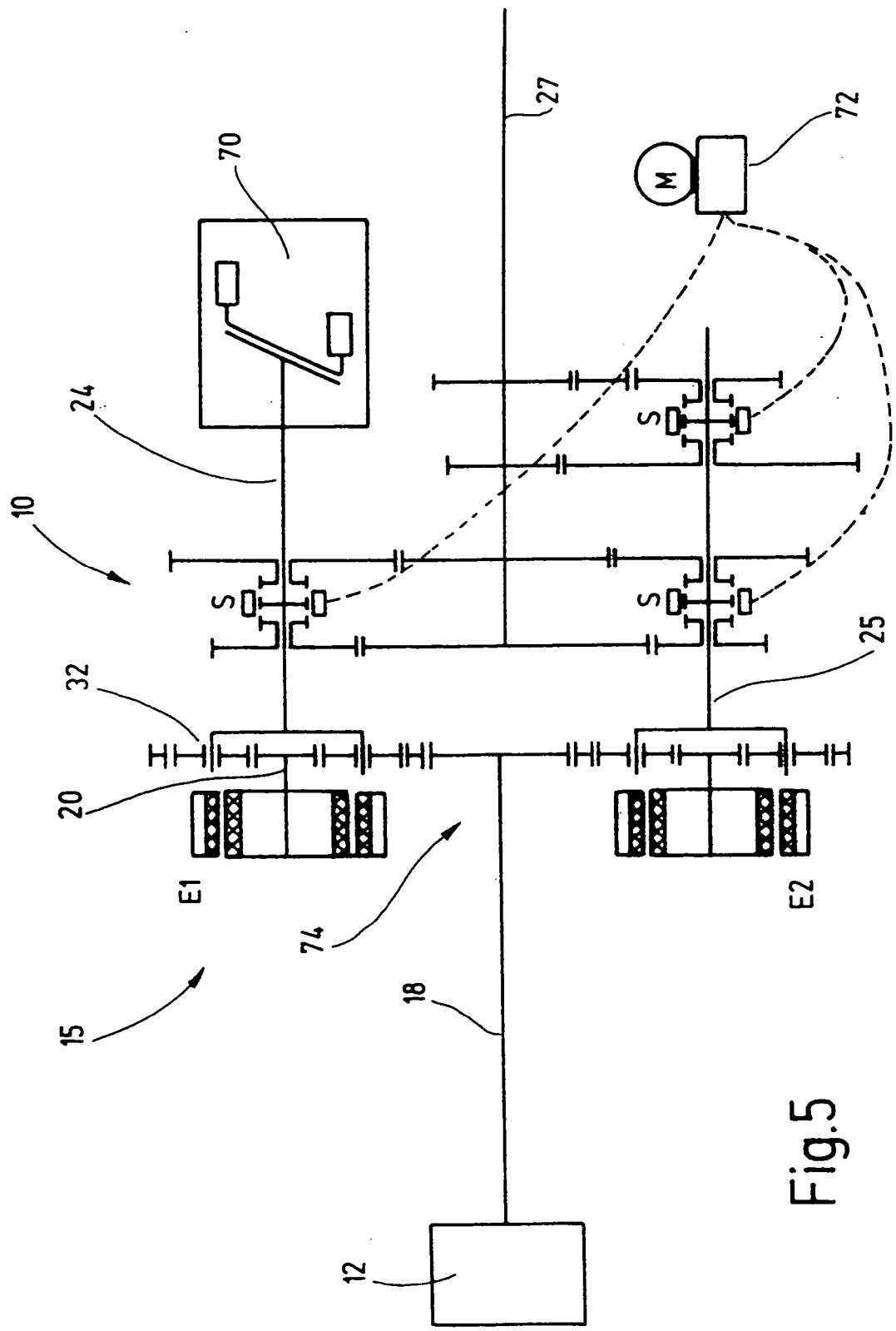
FIG. 5 is a basic circuit diagram of a drive arrangement with a vehicle transmission with two electric machines, one internal combustion engine, and a climate control compressor as an auxiliary system.

FIG. 5 shows a basic circuit diagram of a drive arrangement 10 with a special vehicle transmission 74, an internal combustion engine 12, and a climate control compressor 70 that can be operated therewith. The vehicle transmission 74 in turn includes a planetary gear 32, to which a first electric machine E1 is assigned. It also includes a second planetary gear, with a second electric machine E2. The output shafts 24 and 26 are connected to the drive shaft 27 of the vehicle drive train via sliding cuffs S. The gear 16 of this exemplary embodiment also has a schematically shown transmission converter 72 with a total of three sliding cuffs S, which make it possible to set a gear ratio or do idling. With the arrangement shown, the following operating modes can be achieved:

If the vehicle is in motion and the engine 12 is in operation, the drive of the climate control compressor 70 continues to be done purely mechanically; that is, the required torque is furnished by the vehicle drive train via the shaft 24.

If the vehicle is in motion and the engine 12 is off for example during braking or when centrifugal energy is being utilized, the drive of the climate control compressor 70 continues to be done purely mechanically; that is, the still-present moment of the shaft 24 is utilized. Since a nonpositive engagement with a drive shaft 27 of the vehicle wheels still exists, the vehicle is braked.

If the vehicle is stopped and the engine 12 is turned off, the drive of the climate control compressor 70 is effected mechanically via the first electric machine E1, idling having first been selected by a gear controller 72. If enough energy can be furnished by a vehicle battery, then electrical air conditioning while parked is accordingly already possible without additional storage means or components.

If the vehicle is stopped and the engine 12 is in operation, the drive of the climate control compressor 70 is effected mechanically and electrically. Once again, idling having previously been selected by the transmission converter 72. In this case a drive moment of the climate control compressor 70 is reinforced, stepped down, by the electric machine E1, with the gear ratio furnished via the planetary gear 32. Thus by the choice of an rpm of the electric machine E1, a compressor rpm can be determined.

All these functions can be achieved by components known per se, which usually are already present anyway. For instance, in vehicles having the special transmission 74, only the control of the electric machine E1 and of the transmission converter 72 need to be adapted accordingly. In the latter variant, still other elements could also be connected preceding the climate control compressor 70, such as a spur gear stage or a reversible step-up gear. In this way, a maximum rpm and an rpm spread of the compressor rpm can be limited, thus assuring the most unimpeded possible operation.

What is claimed is:

1. A drive arrangement for at least one auxiliary system of a motor vehicle, having an internal combustion engine, at least one supplementary motor which is an electrical machine formed as a starter generator/motor of the engine, and a gear, characterized in that the gear (16) is a planetary gear (32), which is operatively connected to the engine (12) and the at least one supplementary motor (13) which is an electrical machine formed as a starter generator/motor of the engine, each via a respective input shaft (18, 20), and to the auxiliary system (22) which is a climate control compressor (70) via an output shaft (24), so that the shafts (18, 20, 24) are operatively connected to either one of the engine (12), the at least one supplementary motor (13), and the auxiliary system (22), and a first one of the shafts (18 20, 24) is connected exclusively with a first one of the engine (12), the at least one supplementary motor (13), and the auxiliary system (22), a second one of the shafts (18, 20. 24) is connected exclusively with a second one of the engine (12), the at least one supplementary motor (13), and the auxiliary system (22), and a third one of the shafts (18, 20, 24) is connected exclusively with a third one of the engine (12), the at least one supplementary motor (13), and the auxiliary system (22), wherein the shafts (18, 20, 24) originating from the planetary gear (32).

2. The drive arrangement of claim 1, characterized in that a sun wheel (34) of the planetary gear (32) is connected in a manner fixed against rotation to the input shaft (20) of the supplementary motor (14), and a carrier (36) for at least one planet wheel (38) is connected to the input shaft (18) of the engine (12).

3. The drive arrangement of claim 1, characterized in that a relatively small electric machine (14) is used, which at a moderate power requirement makes a wide governing range possible.

4. The drive arrangement of claim 1, characterized in that the planetary gear (32), the electric machine (E1), and the output shaft (24) are components of a vehicle transmission (74).

5. A method for operating a drive arrangement for at least one auxiliary system of a motor vehicle, having an internal combustion engine, at least one supplementary motor which is an electrical machine formed as a starter generator/motor of the engine and a gear, comprising the steps of:
a) operatably connecting the gear (16) is a planetary gear (32) with at least two input shafts (18, 20) and at least one output shaft (24), and transmitting a torque from the engine (12) and the at least one supplementary motor (13) which is an electrical machine formed as a starter generator/motor of the engine via a respective one of the input shafts (18, 20), to the output shaft (24) and subsequently to the auxiliary system (22) which is a climate control compressor (70); and
b) assigning a control unit (30) to the drive arrangement (10) and detecting an rpm (50) of the output shaft (24) and governing the supplementary motor (13) which is an electrical machine formed as a starter generator/motor of the engine as a function of the rpm (50), so that the shafts (18, 20, 24) are operatively connected to either one of the engine (12), the at least one supplementary motor (13), and the auxiliary system (22), and a first one of the shafts (18 20, 24) is connected exclusively with a first one of the engine (12), the at least one supplementary motor (13), and the auxiliary system (22), a second one of the shafts (18, 20. 24) is connected exclusively with a second one of the engine (12), the at least one supplementary motor (13), and the auxiliary system (22), and a third one of the shafts (18, 20, 24) is connected exclusively with a third one of the engine (12), the at least one supplementary motor (13), and the auxiliary system (22).

6. The method of claim 5, specifying a set-point value or a set-point range for the rpm (50) of the output shaft (24) to the control unit (30).

7. The method of claim 6, forming said supplementary motor (13) as an electric machine (14), which can also be operated as a generator or electric brake, and if the result of the torque transmitted by the engine (12) is an rpm (50) that is above the set-point value or set-point range for the rpm (50) of the output shaft (24), the electric machine (14) is operated as a generator.

8. The method of claim 5, increasing the torque of the supplementary motor (13) if a power requirement to the engine (12) is made as a consequence of a starting or acceleration event of the motor vehicle.

9. A drive arrangement for at least one auxiliary system of a motor vehicle, having an internal combustion engine, at least one supplementary motor which is an electrical machine formed as a starter generator/motor of the engine, and a gear, characterized in that the gear (16) is a planetary gear (32), which is operatively connected to the engine (12) and the at least one supplementary motor (13) which is an electrical machine formed as a starter generator/motor of the engine, each via a respective input shaft (18, 20), and to the auxiliary system (22) which is a climate control compressor (70) via an output shaft (24), so that the shafts (18, 20, 24) are operatively connected to either one of the engine (12), the at least one supplementary motor (13), and the auxiliary system (22), and a first one of the shafts (18 20, 24) is connected exclusively with a first one of the engine (12), the at least one supplementary motor (13), and the auxiliary system (22), a second one of the shafts (18, 20. 24) is connected exclusively with a second one of the engine (12), the at least one supplementary motor (13), and the auxiliary system (22), and a third one of the shafts (18, 20, 24) is connected exclusively with a third one of the engine (12), the at least one supplementary motor (13), and the auxiliary system (22), wherein the first shaft is a sun wheel shaft, the second shaft is a planet wheel carrier shaft, and the third shaft is a ring gear shaft.

10. A drive arrangement for at least one auxiliary system of a motor vehicle, having an internal combustion engine, at least one supplementary motor which is an electrical machine formed as a starter generator/motor of the engine, and a gear, characterized in that the gear (16) is a planetary gear (32), which is operatively connected to the engine (12) and the at least one supplementary motor (13) which is an electrical machine formed as a starter generator/motor of the engine, each via a respective input shaft (18, 20), and to the auxiliary system (22) which is a climate control compressor (70) via an output shaft (24), and wherein a control unit (30) is assigned a drive arrangement (10) and detects an rpm (50) of the output shaft (24) and governs the at least one supplementary motor (13) as a function of the rpm (50).

11. The drive arrangement of claim 10, characterized in that the control unit (30) includes a sensor (26), which measures the rpm (50) of the output shaft.

* * * * *